(12) United States Patent
Ronaess et al.

(10) Patent No.: US 7,671,598 B2
(45) Date of Patent: Mar. 2, 2010

(54) METHOD AND APPARATUS FOR REDUCING INDUCTION NOISE IN MEASUREMENTS MADE WITH A TOWED ELECTROMAGNETIC SURVEY SYSTEM

(75) Inventors: Marit Ronaess, Gjettum (NO); Ulf Peter Lindqvist, Segeltorp (SE)

(73) Assignee: PGS Geophysical AS, Lysaker (NO)

( * ) Notice: Subject to any disclaimer, the term of this patent is extended or adjusted under 35 U.S.C. 154(b) by 176 days.

(21) Appl. No.: 11/998,942

(22) Filed: Dec. 3, 2007

(65) Prior Publication Data

US 2009/0140723 A1 Jun. 4, 2009

(51) Int. Cl.
*G01V 3/00* (2006.01)
(52) U.S. Cl. ..................................... 324/365
(58) Field of Classification Search .............. 324/365
See application file for complete search history.

(56) References Cited

U.S. PATENT DOCUMENTS

| | | | |
|---|---|---|---|
| 2,531,088 A | 11/1950 | Thompson | |
| 6,842,006 B2 | 1/2005 | Conti et al. | |
| 6,914,433 B2 | 7/2005 | Wright et al. | |
| 7,002,350 B1 | 2/2006 | Barringer | |
| 2004/0232917 A1 | 11/2004 | Wright et al. | |
| 2006/0238200 A1 | 10/2006 | Johnstad | |

FOREIGN PATENT DOCUMENTS

| | | |
|---|---|---|
| FR | 2 897 691 | 2/2007 |
| GB | 2 442 849 | 4/2008 |
| WO | WO 02/01406 | 2/2002 |

OTHER PUBLICATIONS

Michael L. Burrows, "*Motion-Induced Noise in Electrode-Pair Extremely Low Frequency (ELF) Receiving Antennas*", Apr. 1974, IEEE Transactions on Communication vol. COMM-22, No. 4, pp. 540-542.
M.L. Burrows, "*Motion-Induced Noise in Towed Flexible Sensors*", Mar. 24, 1969, Project Report for NAC-15 (Navy Communications), MIT Lincoln Laboratory.

*Primary Examiner*—Reena Aurora
(74) *Attorney, Agent, or Firm*—E. Eugene Thigpen; Richard A. Fagin

(57) ABSTRACT

A method for reducing motion induced voltage in marine electromagnetic measurements includes measuring an electromagnetic field parameter at at least one position along a sensor cable towed through a body of water. Motion of the sensor cable is measured at at least one position along the cable; Voltage induced in the cable is estimated from the motion measurements. The measured electromagnetic field parameter is corrected using the estimated voltages.

13 Claims, 1 Drawing Sheet

METHOD AND APPARATUS FOR REDUCING INDUCTION NOISE IN MEASUREMENTS MADE WITH A TOWED ELECTROMAGNETIC SURVEY SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic surveying. More specifically, the invention relates to a method and apparatus for reducing induction noise in measurements made with a towed electromagnetic survey system.

2. Background Art

Electromagnetic geophysical surveying of the Earth's subsurface includes "controlled source" and "natural source" electromagnetic surveying. Controlled source electromagnetic surveying includes imparting an electric field or a magnetic field into subsurface Earth formations, such formations being below the sea floor in marine surveys, and measuring electric field amplitude and/or amplitude of magnetic fields by measuring voltage differences induced in electrodes, antennas and/or interrogating magnetometers disposed at the Earth's surface, or on or above the sea floor. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields. Natural source (magnetotelluric) electromagnetic surveying typically includes deploying multi-component ocean bottom receiver stations and by taking the ratio of perpendicular field components, it is possible to eliminate the need to know characteristics of the natural source.

Controlled source electromagnetic surveying known in the art includes imparting a substantially continuous, time varying electromagnetic field into the subsurface formations by passing time varying electric current through a transmitter antenna. The alternating current has one or more selected discrete frequencies. Such surveying is known as frequency domain controlled source electromagnetic (f-CSEM) surveying. Another technique for controlled source electromagnetic surveying of subsurface Earth formations known in the art is transient controlled source electromagnetic surveying (t-CSEM). In t-CSEM, electric current passed through a transmitter at the Earth's surface (or near the sea floor), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching techniques are possible. Structure of the subsurface is inferred by the time distribution of the induced voltages and/or magnetic fields. For example, U.S. Patent Application Publication No. 2004/232917 and U.S. Pat. No. 6,914,433, issued to Wright et al., describe a method of mapping subsurface resistivity contrasts by making multichannel transient electromagnetic ("MTEM") measurements on or near the Earth's surface using at least one source, receiving means for measuring the system response and at least one receiver for measuring the resultant earth response. All signals from each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored.

The above methods for f-CSEM and t-CSEM have been adapted for use in marine environments. Cable-based sensors have been devised for detecting electric and/or magnetic field signals resulting from imparting electric and/or magnetic fields into formations below the bottom of a body of water. See, for example, U.S. Patent Application Publication No. 2006/0238200 filed by Johnstad. The amplitude of electric field signals detected by electrodes on cables such as described in the Johnstad publication may be on the order of fractions of a nanovolt. Accordingly, a particular consideration in the design and implementation of electromagnetic survey receiver systems is reducing the amount of noise that may be induced in the signals detected by the various sensing elements in the receiver system.

It is desirable to have a marine electromagnetic survey system in which receivers can be towed in the water behind a survey vessel, analogously to a marine seismic survey. By towing the receivers, the efficiency of surveying may be substantially increased over methods known in the art in which receivers are deployed on the water bottom and retrieved after part of the subsurface is surveyed. A particular consideration in designing a towed electromagnetic receiver system is that velocity of parts of the system may result in voltages being induced in the system. Such voltages may be sufficiently large so as to make it impracticable to measure signals related to subsurface electromagnetic phenomena. There is a need for a towed marine electromagnetic receiver system which may have enhanced capability of attenuating induction noise in the signals detected with such system.

SUMMARY OF THE INVENTION

A method for reducing motion induced voltage in marine electromagnetic measurements according to one aspect of the invention includes measuring an electromagnetic field parameter at least one position along a sensor cable towed through a body of water. Motion of the sensor cable is measured at least one position along the cable. Voltage induced in the cable is estimated from the motion measurements. The measured electromagnetic field parameter is corrected using the estimated voltages.

An electromagnetic sensor cable system according to another aspect of the invention includes a cable configured to be towed by a vessel through a body of water. The system includes at least one electromagnetic sensor disposed along the cable, at least one motion sensor disposed along the cable and configured to measure a parameter related to motion of the cable through the body of water, and means for estimating a voltage induced in the cable from measurements made by the at least one motion sensor.

DETAILED DESCRIPTION

Figure 1:
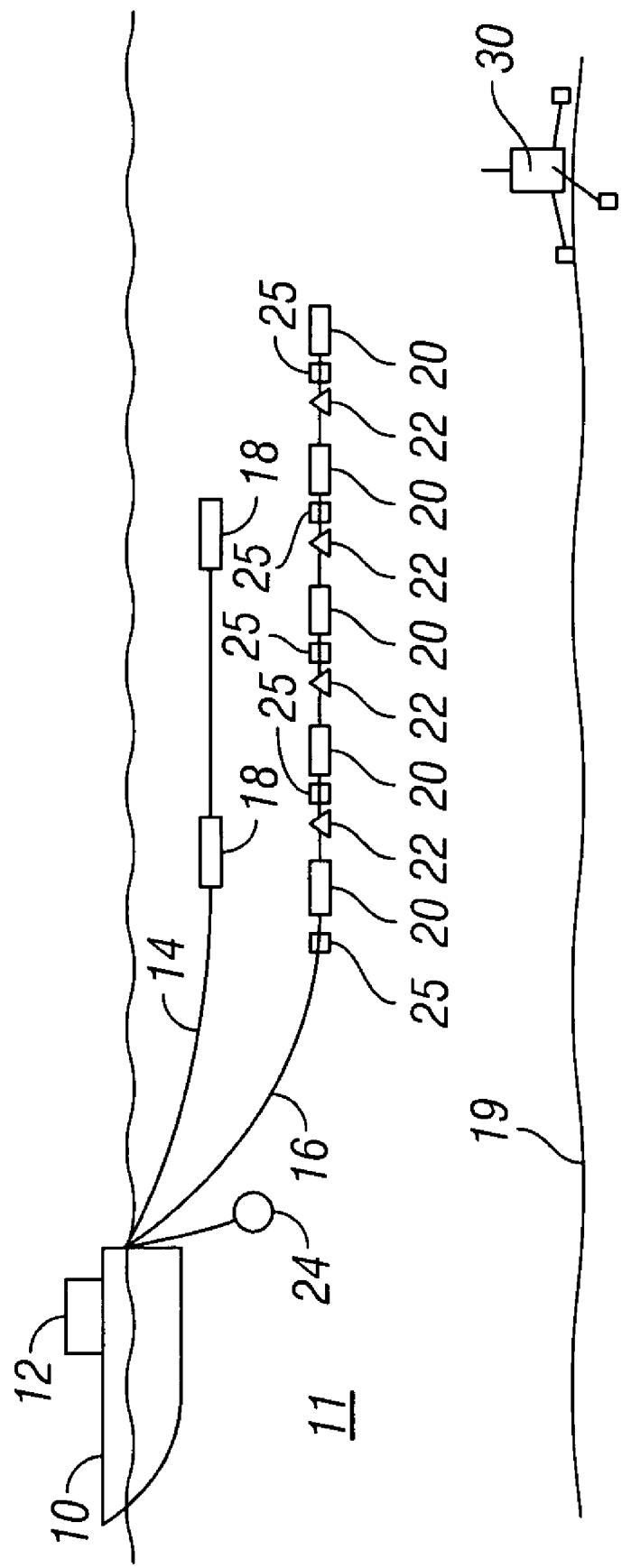
FIG. 1 shows an example marine electromagnetic survey system having a towed sensor cable.

An example marine electromagnetic survey system is shown schematically in FIG. 1. A survey vessel 10 moves along the surface of a body of water 11 such as a lake or the ocean. The vessel 10 may include equipment, shown generally at 12 and referred to for convenience as a "recording system" that includes devices (none shown separately) for applying electric current to an antenna such as source electrodes 18 and/or other devices disposed on or along a source cable 14 towed by the vessel 10. The recording system 12 may also include equipment for navigating the vessel 10, for determining the geodetic position of the vessel 10 and of components towed by the vessel 10 in the water 11, and for recording signals detected by one or more sensors on a sensor cable 16. As shown in FIG. 1, the sensor cable 16 may also be towed by the vessel 10.

The source cable 14 in the present example can include an antenna consisting of two source electrodes 18 disposed at spaced apart positions along the source cable 14. At selected times certain of the equipment (not shown separately) in the recording system 12 conducts electric current across the source electrodes 18. The time varying component of such electric current produces an electromagnetic field that propagates through the water 11 and into the formations below the water bottom 19. The particular type of current conducted across the source electrodes 18 may be single or multiple discrete frequency alternating current as is used in frequency domain electromagnetic surveying, or various forms of switched direct current, such used in transient controlled source electromagnetic surveying. It is within the scope of the invention therefore to perform either or both frequency domain and transient controlled source electromagnetic surveying. It should also be understood that the arrangement of the source electrodes 18 shown in FIG. 1, referred to as a horizontal electric dipole antenna, is not the only type of electromagnetic transmitter antenna that may be used with the invention. The source cable 14 could also include, in addition to or in substitution of the horizontal electric dipole transmitter antenna shown in FIG. 1, any one or more of a vertical electric dipole antenna, and horizontal or vertical magnetic dipole antenna (current loop). Accordingly, the electromagnetic field source antenna configuration shown in FIG. 1 is not intended to limit the scope of the present invention.

In the example of FIG. 1, the vessel 10 can also tow at least one sensor cable 16. The sensor cable 16 can include at least one electromagnetic sensor 20, and preferably a plurality of such sensors at spaced apart positions along the sensor cable 16. Each of the one or more electromagnetic sensors measures a parameter related to the electromagnetic field resulting from interaction of the electromagnetic field induced by the transmitter (e.g., source electrodes 18) with the subsurface formations below the water bottom 19. In the present example, the electromagnetic sensors may be a pair of receiver electrodes disposed at spaced apart positions along the sensor cable 16. An electric field component of the electromagnetic field resulting from interaction of the induced electromagnetic field with the formations below the water bottom 19 can induce voltages across each of the pairs of receiver electrodes, and such voltages may be detected by any form or voltage measuring circuit (not shown) known in the art. Such voltage measuring circuits (not shown) may be disposed in the sensor cable 16 and/or in the recording system 12.

Another example of an electromagnetic sensor that may be used in other examples is a single axis or multi-axis magnetometer, such as a flux gate magnetometer.

The sensor cable 16 in some examples may also include seismic sensors, such as hydrophones and/or geophones, shown generally at 22, disposed at spaced apart locations along the sensor cable 16. For such examples where the sensor cable 16 includes seismic sensors, the survey vessel 10 or another vessel may tow a seismic energy source 24 such as an air gun or array of air guns. The seismic energy source 24 may be actuated at selected times by certain equipment (not shown separately) in the recording system 12 and signals detected by the seismic sensors 22 may be recorded by a signal recording device (not shown separately) in the recording system 12. During survey operations, seismic signals may be acquired substantially contemporaneously with electromagnetic signals detected by the electromagnetic sensor 20 or may be acquired at other times.

It should be understood that the example system of FIG. 1 including only one sensor cable 16 is shown to illustrate how to make and use a sensor cable according to various aspects of the invention. A sensor cable according to the various aspects of the invention may be used with acquisition systems that include a plurality of laterally spaced apart sensors cables towed by the survey vessel 10 and/or by another vessel in a selected configuration to provide "in line" and "cross line" electromagnetic and/or seismic signals. Accordingly, the number of sensor cables and their particular geometric configuration in the water 11 are not limits on the scope of the present invention.

As described above, the receiver electrodes measure voltages induced by the electromagnetic field generated as a result of the interaction of the induced electromagnetic field with the formations below the water bottom 19. It will be appreciated by those skilled in the art that motion of the survey vessel 10 and motion of the sensor cable 16 are not uniform through the water 11. Such non-uniform motion results from currents in the water and acceleration of the vessel 10 (change on velocity) transferred to the sensor cable 16 through the towing equipment. Such non-uniform motion of the sensor cable 16 can induce voltages along electrical conductors (not shown) in the receiver cable 16 as well as in the electromagnetic sensors 20. The motion-induced voltages can be calculated or estimated if the motion of sensor cable 16 proximate the electromagnetic sensors 20 is known. In the present example, motion sensors 25 may be disposed at selected positions along the sensor cable 16. In the example of FIG. 1, the motion sensors 25 are each shown as located proximate to one of the electromagnetic sensors 20. The example number of motion sensors 25 and their placement as shown in FIG. 1 are not intended to limit the number of motion sensors or their particular geometric configuration that may be used in other examples of an electromagnetic sensor cable according to the invention. The signals measured by the motion sensors 25 may be detected and processed by certain equipment (not shown) in the recording system 12, and may be used, as will be explained below, to estimate magnitude of induced voltages resulting from motion of parts of the sensor cable 16 with respect to the electromagnetic field induced by the transmitter cable 14 and with respect to the Earth's magnetic field. Such estimates may be used in processing measurements made from the electromagnetic sensors 20 on the sensor cable 16 to reduce the effects of the motion induced voltages on the measurements made by the electromagnetic sensors 20.

Faraday's Law of Induction states that an induced electromotive force (voltage) in an electrical conductor is related to the rate of change with respect to time of magnetic flux through the electrical conductor. As the system shown in FIG. 1 is towed through the water 11, the sensor cable 16 is moved within the electromagnetic field induced by the transmitter (e.g., current across transmitter electrodes 18) and the Earth's magnetic field. Thus, any acceleration (change in velocity) of any part of the sensor cable 16 can change the magnetic flux passing through electrically conductive parts of the sensor cable 16 and induce voltages, which may be detected by the one or more electromagnetic sensors 20.

The motion sensors 25 may be, for example accelerometers, gyroscopes (including rate gyroscopes), magnetic compasses, or any other type of motion sensor that can make a measurement corresponding to the motion of sensor cable 16. Such measurements of motion of the sensor cable 16 from the one or more motion sensors 25 may be used, for example, with a numerical model applying Faraday's Law of Induction to provide an estimate of the motion-induced voltages. The estimates of the motion-induced voltages may then be used to correct or adjust the measurements made by the electromagnetic sensors 20. In some examples, the induced voltage may be further compensated by measuring the magnetic field at a fixed location, for example, on the water bottom, and using any time variation in the magnetic field amplitude to provide a further calculation of induced voltage. The calculations explained above may be performed in the recording system 12, or may be performed, for example, by a computer (not shown) at a location other than in the recording system 12. In some examples, the motion sensors 25 may be strain gauges arranged to measure axial elongation and/or bending of the sensor cable 16. Such measurements of axial elongation and/or bending may be used to estimate motion of the sensor cable 16.

In some examples, a single component or multiple component magnetic field sensor 30 may be disposed at a substantially fixed location, such as on the water bottom 19. Measurements made during the acquisition of electromagnetic signals as explained above may be further compensated, adjusted or corrected using measurements made by the magnetic field sensor 30. One example of such a magnetic field sensor that may be used in some examples is described in U.S. Pat. No. 6,842,006 issued to Conti et al. and incorporated herein by reference. The magnetic field sensor 30 may include autonomous recording devices (not shown) therein, or may include an electrical connection to a buoy (not shown) at the water surface. Such buoy may include wireless signal communication devices for communicating recorded data to the recording system 12. The manner and place of recording signals detected by the magnetic field sensor 30 are not limitations on the scope of the present invention. The magnetic field measurements made by the magnetic field sensor 30 may be used, for example, to correct measurements made by the electromagnetic sensors 20 for any time-dependent variations in the Earth's magnetic field.

A marine electromagnetic survey cable made according to the invention may provide more accurate electrical field measurements of undersea formations than other types of cables used for marine electromagnetic surveying.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic sensor cable system, comprising:
a cable configured to be towed by a vessel through a body of water;
at least one electromagnetic sensor disposed along the cable;
at least one motion sensor disposed along the cable and configured to measure a parameter related to motion of the cable through the body of water; and
means for estimating a voltage induced in the cable from measurements made by the at least one motion sensor.

2. The apparatus of claim 1 wherein the electromagnetic sensor comprises a pair of electrodes.

3. The apparatus of claim 1 wherein the motion sensor comprises an accelerometer.

4. The apparatus of claim 1 wherein the motion sensor comprises a gyroscope.

5. The apparatus of claim 1 wherein the motion sensor comprises a compass.

6. The apparatus of claim 1 wherein the motion sensor comprises a strain gauge.

7. A method for reducing motion induced voltage in marine electromagnetic measurements, comprising:
measuring an electromagnetic field parameter at at least one position along a sensor cable towed through a body of water;
measuring a parameter related to motion of the sensor cable at at least one position along the cable;
estimating voltage induced in the cable from the measured parameter related to motion; and
correcting the measured electromagnetic field parameter using the estimated voltages.

8. The method of claim 7 wherein the electromagnetic field parameter comprises voltage.

9. The method of claim 8 further comprising measuring a magnetic field parameter at a substantially fixed position and using the magnetic field parameter measurements to correct measurements of the electromagnetic field parameter for time-dependent magnetic field variations.

10. The method of claim 9 wherein the time-dependent magnetic field variations comprise variations in the Earth's magnetic field.

11. The method of claim 7 wherein the motion related parameter comprises acceleration.

12. The method of claim 7 wherein the motion related parameter comprises geodetic direction.

13. The method of claim 7 wherein the motion related parameter comprises at least one of axial strain and bending strain.

* * * * *